Aug. 19, 1969   S. E. SZASZ ET AL   3,462,228
APPARATUS FOR COMPARING GRAPH CURVES INCLUDING A DICHROIC MIRROR
Filed Nov. 9, 1967   3 Sheets-Sheet 1
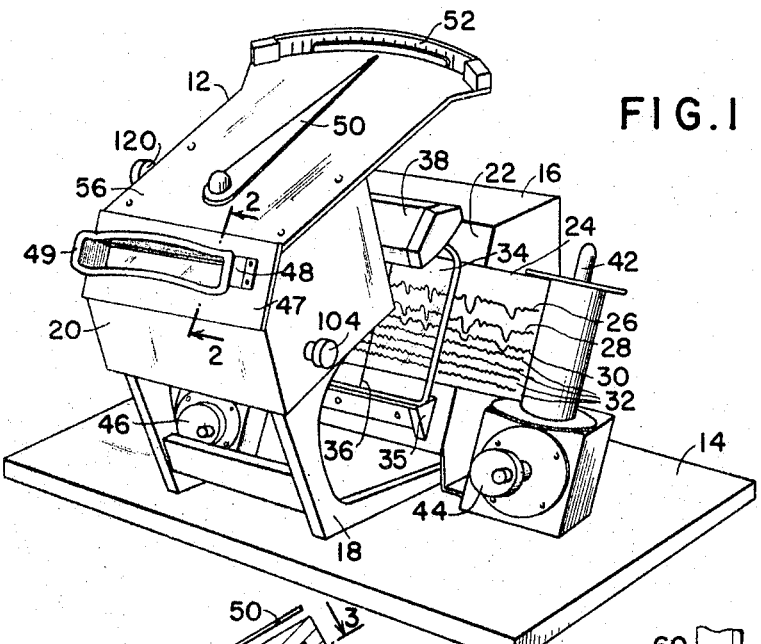
FIG.1
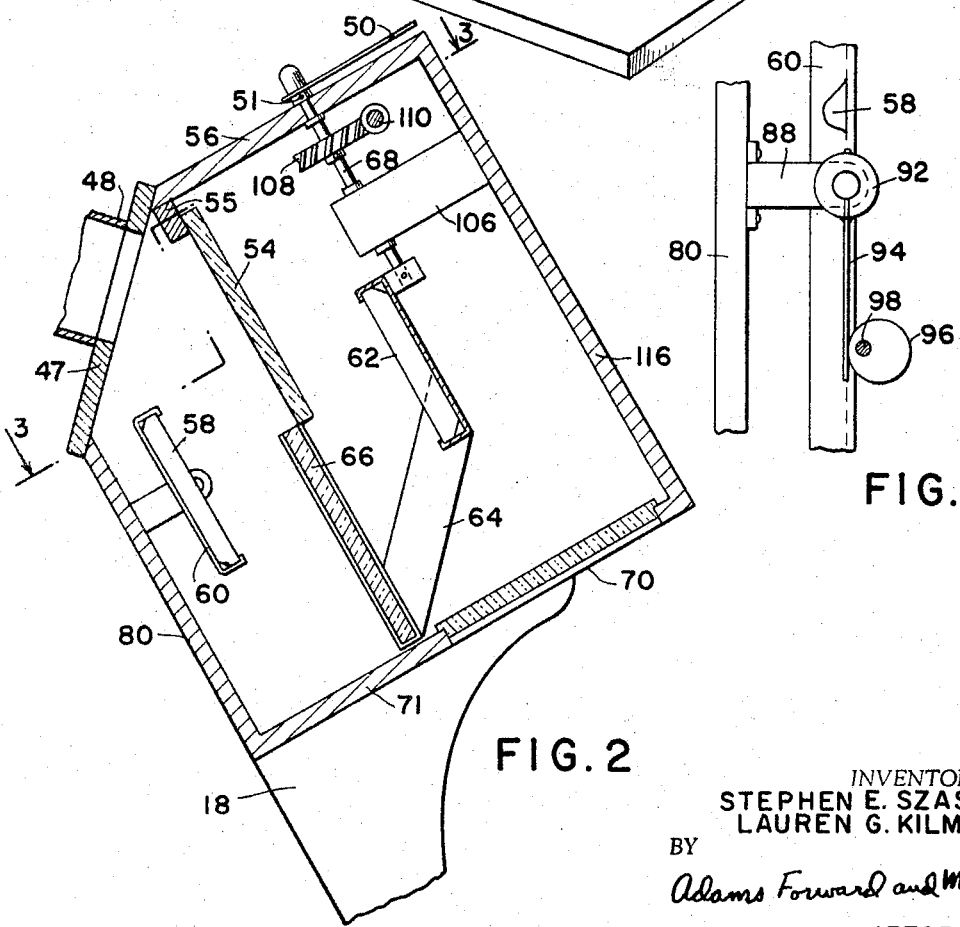
FIG.2
FIG.4
INVENTORS:
STEPHEN E. SZASZ
LAUREN G. KILMER
BY
Adams Forward and McLean
ATTORNEYS

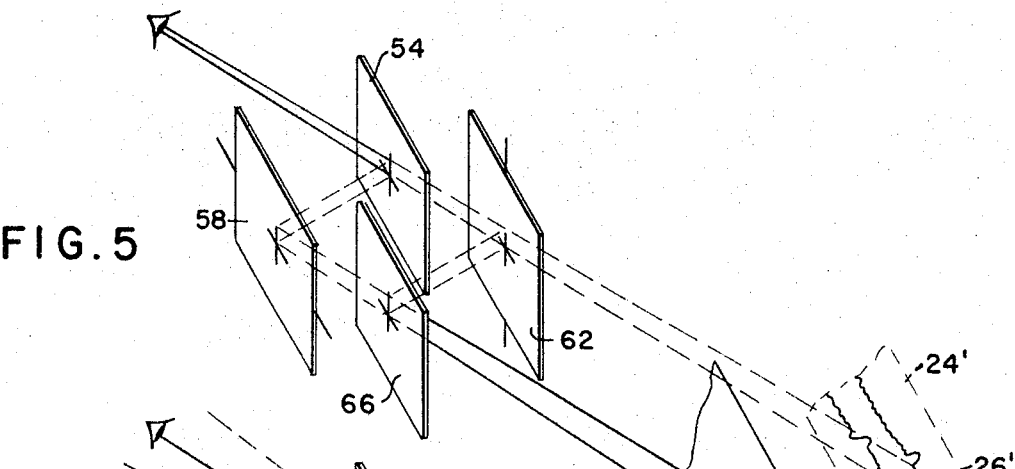
FIG.5
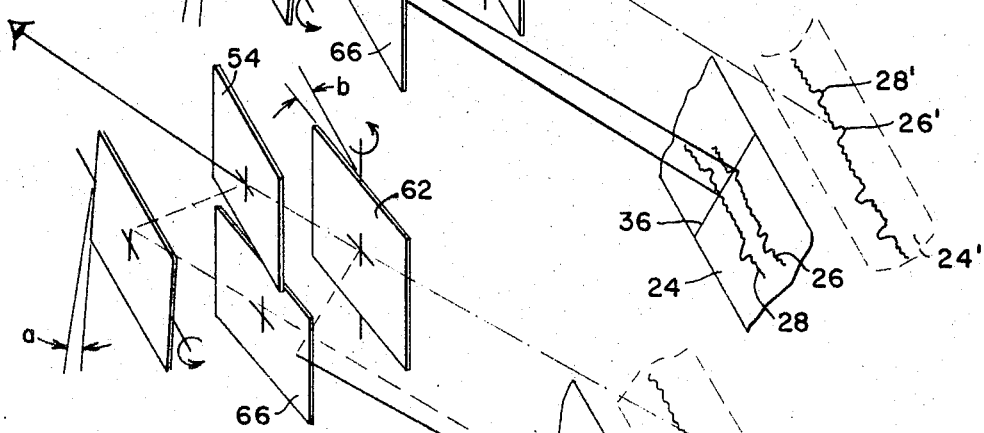
FIG.6
FIG.7
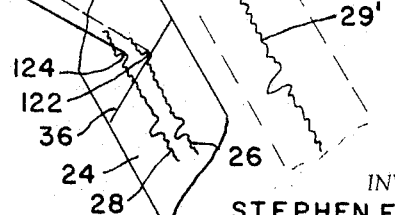
INVENTORS:
STEPHEN E. SZASZ
LAUREN G. KILMER
BY
Adams Forward and McLean
ATTORNEYS

United States Patent Office 3,462,228
Patented Aug. 19, 1969

3,462,228
APPARATUS FOR COMPARING GRAPH CURVES INCLUDING A DICHROIC MIRROR
Stephen E. Szasz and Lauren G. Kilmer, Tulsa, Okla., assignors to Sinclair Research, Inc., New York, N.Y., a corporation of Delaware
Continuation of application Ser. No. 331,590, Dec. 18, 1963. This application Nov. 9, 1967, Ser. No. 681,937
Int. Cl. G01b *11/24;* G02f *3/00*
U.S. Cl. 356—168                                                4 Claims

ABSTRACT OF THE DISCLOSURE

Apparatus for superimposing images of objects displaced on a common plane. Light in the line of sight from the object plane to a viewing aperture is divided by a dichroic mirror into first and second light paths. The first light path is reflected to a first front surfaced mirror which re-reflects it to the non-reflecting surface of a semi-transparent mirror. The second path passes through the dichroic mirror to a second front surfaced mirror which reflects it to the reflecting surface of the semi-transparent mirror. Passage of the first light path through the semi-transparent mirror and reflection of the second light path by the semi-transparent mirror results in two images at the viewing aperture. The second front surfaced mirror is pivoted about an axis to align the two images in one dimension, and the dichroic mirror and the first front surfaced mirror are pivoted as a unit to align the two images in the second dimension.

---

This application is a continuation of application Ser. No. 331,590, filed Dec. 18, 1963, now abandoned.

This invention pertains to an optical instrument and more particularly to a comparator for measuring the distance between geometrically similar objects occurring in the same plane. The present invention will be useful in many applications. However, it has been developed to fulfill a requirement in connection with well logging, and this description will be directed to the manner in which the invention has been so employed.

When a stratified earth formation is penetrated by a cylindrical well bore it is of interest to the geologist and petroleum engineer to be able to determine at any of several points the inclination of the stratum against the horizontal plane (dip) and the azimuth of the maximum inclination (strike). To acquire this information a continuous dip meter log is kept. In a typical log three principal curves and four auxiliary curves are recorded on the same strip of paper with depth as a common base extending lengthwise of the strip. On the principal curves the local resistivity of the stratum is recorded as a function of depth; this resistivity being measured by three pairs of contact electrodes located within the well, 120° apart on a plane perpendicular to the axis of the well bore. When a shale break between strata or other discontinuity from one stratum to another is encountered, local resistivity changes and similar anomalies are recored by the three pairs of electrodes. If the discontinuity is in a plane perpendicular to the axis of the well bore the three pairs of electrodes will record the anomalies at the same depth but if the shale break and hence the stratum is inclined with respect to the bore hole the anomalies will be recorded at different depths.

On the four auxiliary curves are recorded the diameter of the bore hole, the azimuth of one electrode pair, the inclination of the axis of the bore hole with respect to the vertical and the azimuth of the inclination of the bore hole. By measuring the difference in depth between corresponding anomalies on the principal curves and using the values indicated by the auxiliary curves at the same depth, the dip and strike can be calculated by conventional methods of spherical trigonometry.

This invention is not concerned with the measurement of resistivity in the bore hole, but has as its purpose the provision of an optical instrument for measuring differences in depth between the anomalies recorded on the principal curves of a dip meter log.

Various optical instruments have been suggested for this measurement. These generally provide image shifting arrangements permitting vertical (lateral) displacement of the image of one curve to align it horizontally (lengthwise) with the image of a second and horizontal displacement to superimpose the events of interest on the aligned curves. These have proved more or less unsatisfactory for various reasons. They frequently involve displacement of reflective element by complex rack and pinion methods designed to maintain the reflective surface in a fixed angular relationship to the objective surface. Such systems are complicated and subject to inaccuracy after a short time due to wear. Further, measurement of image shift is frequently effected through a gear train which necessarily incorporates backlash increasing with age. Moreover, use of these comparators is fatiguing since they often require that the viewer assume uncomfortable positions and look through telescopic eye pieces at a specific point. It is a further object of this invention to provide an optical comparator in which the above mentioned disadvantages are eliminated and which is simple and inexpensive to build.

These and other objects of the present invention have been accomplished by a novel arrangement of reflective elements and objective surface whereby it is possible to superimpose virtual images solely by the rotation of reflective elements. To this novel combination has been added a direct measurement of shift from the axis of rotation of the various elements resulting in an instrument which is free of complicating devices.

In accordance with this invention as in the prior devices constructed for reading dip logs two virtual images are produced. One virtual image produced along a first optical path is shifted in a direction perpendicular to the length of the curves being compared and the other virtual image produced along a second optical path is shifted in a direction parallel to the length of the curves. By a proper combination of these movements the images can be superimposed and, by measurement of the shift required to produce superposition, the difference in depth between the anomalies appearing on the curves is determined.

The apparatus of this invention contains two semi-transparent mirrors and two total reflecting mirrors for interposition between a viewing aperture and an objective surface. A first semi-transparent mirror and a first total reflecting mirror are mounted with their reflective surfaces confronting, and the first optical path passes from the objective surface and is reflected from the first total reflecting mirror to the first semi-transparent mirror from which it is reflected to the eye of the viewer. One of these mirrors is fixedly mounted at a predetermined angle to the objective surface and the other mirror is rotatably mounted about an axis parallel to the planes of the objective surface and the fixedly mounted mirror.

The second semi-transparent mirror and the second total reflecting mirror are mounted in a common frame with their reflective surfaces confronting, parallel, and spaced apart. The second optical path passes from the objective surface to the second semi-transparent mirror from which it is reflected to the second total reflecting mirror and reflected thereby to the eye of the viewer.

The frame in which the second pair of mirrors is mounted is capable of being rotated about an axis parallel to the reflective plane of the fixedly mounted mirror of the first pair of mirrors, the projection of such axis on such plane being perpendicular to the projection of the rotational axis of the other of the first pair of mirrors on the same plane. Since both the first and second optical paths contain rotatable reflective elements the position of virtual images formed along these optical paths can be shifted. Further, since the two axes of rotation in the optical paths are perpendicular, either intersecting or nonintersecting, the virtual images can be shifted in transverse directions.

The first semi-transparent mirror is so positioned between the eye of the viewer and the second total reflecting mirror that light traveling along the second optical path passes through the first semi-transparent mirror. Since the first optical path is reflected from the same semi-transparent mirror, images formed along each optical path of corresponding events displaced from each other on the objective surface can be brought into alignment with each other and superposed upon each other by means of the aforementioned image shifts. The amount of rotation necessary to produce superposition is a measure of the distance between such corresponding events on the objective surface, such distance being indicated on a calibrated scale. Since movement of the images is accomplished exclusively by rotation of elements inaccuracy due to wear is small and easily compensated. Further, since measurement of shift is accomplished independent of the mechanism for producing shift the latter can be greatly simplified and in one construction of the present invention this mechanism includes a flexible member.

The second semi-transparent mirror is required to be semi-transparent, since geometrically it is positioned in the first optical path when the comparator of this invention is used in measuring the displacement of closely positioned events. As a further aid to the practice of the present invention, since the positioning of each semi-transparent mirror is such that it transmits light in the optical path which the other reflects, a dichroic mirror can be used as one or the other of the semi-transparent mirrors. Thus images formed along the two optical paths, are of complementary colors and are thus more easily distinguished by the viewer particularly since a neutral color is formed upon superposition of common events.

For a further description of the present invention, reference is made to the attached drawings in which:

FIGURE 1 is an oblique view of a comparator constructed in accordance with this invention;

FIGURE 2 is a partial elevation in section taken along line 2—2 of FIGURE 1;

FIGURE 4 is a fragmentary sectional view taken along line 4—4 in FIGURE 3;

FIGURE 5 is a perspective view of the optical components of the comparator of FIGURE 1;

FIGURE 6 is a perspective view of the optical components of the comparator of FIGURE 1; and FIGURE 7 is a perspective view of the optical components of the comparator of FIGURE 1.

Figure 3:
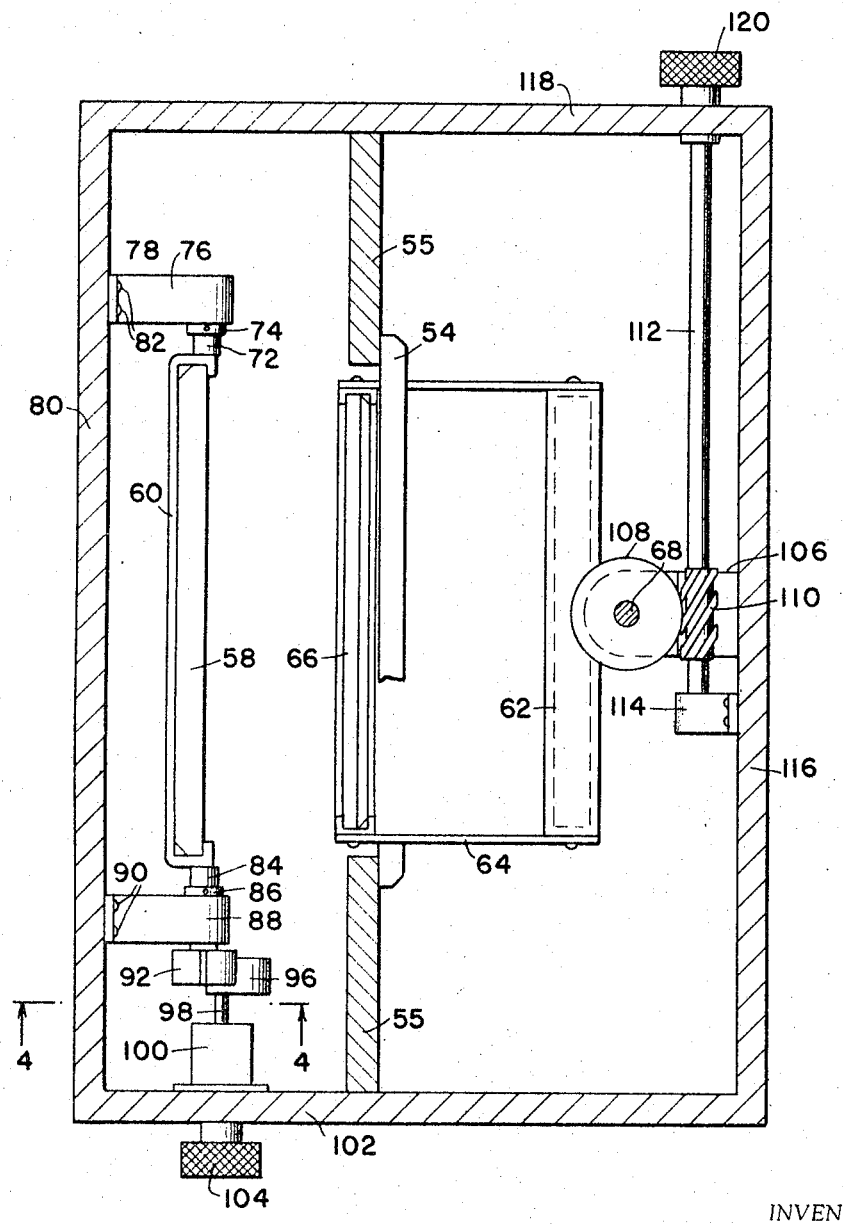
FIGURE 3 is a plan view in section taken along line 3—3 in FIGURE 2.

FIGURE 1 shows a comparator 12 consisting of a base 14 having on the rear thereof a log winding table 16 in front of which is a housing 20 supported some distance above base 14 by a vertical support member 18.

Log winding table 16 can be any suitable structure having as its forward side a flat objective surface 22 which slopes upward and to the rear. Across objective surface 22 is disposed a dip meter log 24 on which are recorded three principal curves 26, 28 and 30 and four auxiliary curves shown generally at 32. Dip meter log 24 is held against objective surface 22 by a transparent cover plate 34 having thereon a transverse reference mark 36. Reference mark 36 is etched on the side of cover plate 34 nearest the dip meter log 24 to eliminate error due to parallax. Cover plate 34 is supported by viewing surface 22 and a horizontal ledge 35 attached to viewing surface 22 at the lower portion thereof. A light 38 is positioned adjacent housing 20 directed to illuminate the entire objective surface 22. One end of dip meter log 24 is wrapped around a roller 40 which is positioned to one side of log winding table 16 on a vertical rotating spindle 42 which is rotated by turning knob 44. The opposite end of log 24 is similarly wrapped on a roller which is positioned on a spindle and rotatably controlled by knob 46. By moving knobs 44 and 46 dip meter log 24 can be moved to the left or right to position it as desired on log winding table 16.

Housing 20 is a long box-like enclosure. It has a substantially square cross-section except for a fifth side 47 which intersects the top wall 56 and the front side 80 near the top front corner. Side 47 contains a large oblong viewing aperture 48 which extends above side 47 and has an upper edge shaped to receive the outline of a man's head. The top edge of aperture 48 is covered with a leather cushion 49. The axis of viewing aperture 48 is directed into housing 20 at an angle of 45° to top wall 56.

A pointer 50 is mounted adjacent wall 56 and directed at a calibrated scale 52. Scale 52 is supported by wall 56 which has been extended beyond the rear side 116 of housing 20 a sufficient distance to insure accuracy in the readings obtained, and widened beyond side 116 so that a scale of ample size can be used.

The bottom wall 71 of housing 20 contains a large rectangular window 70 located near side 116. Window 70 permits passage of light between viewing table 16 and the optical elements contained withtin housing 20.

Housing 20 is mounted on support 18 so that the planes of side 80 and objective surface 22 intersect at a 45° angle. The distance between housing 20 and objective surface 22 is not critical but rather is controlled by two considerations. It must be sufficiently large that the values of auxiliary curves 32 can be read without moving log 24, and yet not so large that viewing aperture 48 is above the normal eyelevel of a man sitting at a desk.

Referring to FIGURE 2 which shows the interior of housing 20, a semi-transparent mirror 54 is fixedly mounted adjacent partition 55 perpendicular to wall 56 with its semi-reflective surface disposed towards viewing aperture 48. Partition 55 is cut away to expose almost all of mirror 54 to viewing aperture 48. A first front surfaced mirror 58 is mounted adjacent wall 80 capable of being rotated about a horizontal axis parallel to the plane of mirror 54. Mirror 58 has its reflective surface generally disposed towards mirror 54 and is positioned so that a ray of light from viewing aperture 48 reflected from mirror 54 intersects mirror 58 in the middle.

A second front surfaced mirror 62 is mounted with its refletcive surface in a plane perpendicular to wall 56 so positioned that a ray of light from viewing aperture 48 passing through semi-transparent mirror 54 intersects mirror 62 in the middle. A dichroic mirror 66 is mounted with its semi-reflective surface confronting and parallel to mirror 62 and positioned generally beneath semi-transparent mirror 54. Mirrors 62 and 66 are mounted in a common bracket 64 which is capable of being rotated about an axis perpendicular to wall 56. A ray of light from viewing aperture 48 passing through semi-transparent mirror 54 and reflected from mirror 62 intersects dichroic mirror 66 and is reflected therefrom through window 70. The mounting of mirrors 58, 62 and 65 can be more fully described by reference to FIGURE 3.

Mirror 58 is fixedly mounted in a retainer 60. In the center of one side of retainer 60 a stub shaft 72 having its axis in the reflective plane of mirror 58 extends into a bearing 74 mounted in a journal 76 which is attached to wall 80 by screws 82. To maintain the axis of rotation of mirror 58 horizontal and parallel to mirror 54 journal 76 is adjustable. It can be moved away from wall 80 by inserting shims between journal 76 and wall 80, or it can be moved up and down by loosening screws 82, moving journal 76 as desired and tightening screws 82.

On the other side of retainer 60, a stub shaft 84 having its axis coincident with the axis of stub shaft 72 extends through a bearing 86 mounted in a journal 88 attached to wall 80 by screws 90. A flange 92 is mounted on the other end of stub shaft 84. As shown in FIGURE 4 flange 92 includes a lever arm 94 which extends below shaft 84 and tangentially contacts an eccentric cam 96. The axes of shafts 72 and 84 being in the front, reflective plane of mirror 58, the weight of the retainer 60 and the mirror 58 operate to maintain a positive counterclockwise force on lever arm 94 keeping it in contact with cam 96. As shown in FIGURE 3, cam 96 is mounted on a shaft 98 which passes through bearing housing 100 in the side wall 102 of housing 20. The position of cam 96 and hence the inclination of mirror 58 is controlled by turning knob 104 mounted on the outer end of shaft 98.

Shaft 68 on which bracket 64 is rotatably mounted, passes through support 106 and top wall 56. Rotation of shaft 68 is controlled by a pinion 108 affixed thereon intermediate wall 56 and support 106 meshing with a worm gear 110. Worm gear 110 is suitably mounted on a shaft 112 supported on one end by pedestal 114 with the other end passing through the side wall 118 of housing 20. Rotation of worm gear 110 and hence of shaft 68 and bracket 64 is affected by turning knob 120 on the outer end of shaft 112. Since shaft 112 operates only to rotate bracket 64, in one variation of this invention a flexible cable is used in place of shaft 112. In that case a pedestal on each side of worm gear 110 is required.

The amount of rotation of bracket 64 is indicated by pointer 50 mounted on the end of shaft 68 which extends through top wall 56.

The operation of the comparator 12 is best explained by reference to FIGURES 5, 6 and 7. These figures show the optical components of comparator 12 and a dip meter log 24 having recorded thereon two principal curves 26 and 28. In operation two curves are compared at one time and therefore this explanation will proceed with reference to two curves only. It should be understood, however, that in actual use three principal curves appear on the dip meter log and are compared two at a time.

Light passes between the dip meter log and the eye of the viewer by two different optical paths. The first path starts at the dip meter log 24, passes through dichroic beam splitter 66, is reflected from mirror 58 to beam splitter 54 from which it is reflected to the eye of the viewer. The second path starts at dip meter log 24, is reflected from dichroic beam splitter 66 to mirror 62 from which it is reflected through beam splitter 54 to the eye of the viewer. Beam splitter 54, mirrors 58 and 62 and dichroic beam splitter 66 are so arranged that the lengths of the two optical paths are almost equal, and therefore images formed by these paths appear to occur in a common plane.

The particular dichroic beam splitter 66 employed at the angles selected transmits green light along the first optical path and reflects red (magenta) light along the second optical path; thus the virtual image formed by the first optical path is green and the virtual image seen along the second optical path is red. Since green and red are complementary colors and since the optical paths are of almost equal length the plane 24' of the virtual image of the well-log sheet seen along the first path is apparently coincident with the plane of the sheet seen along the second path, and consequently the background has the same whitish, neutral hue normally characteristic of well-log paper. When black lines marked on the well-log paper are coincident, i.e. superimposed, in the two virtual images, these appear black. When, however, they are not coincident the black lines seen in the virtual image along the first optical path have a red color, since the only light which appears at the location of such line in the virtual image along the first path is the background of the well-log paper in the virtual image along the second optical path. Conversely non-superimposed black lines appearing in the virtual image along the second optical path have a characteristically green color. It will be apparent therefore that the employment of the dichroic beam splitter is highly desirable in order to permit definition of superimposed images, as the lines will appear black only when superimposed.

Referring to FIGURE 5 there is shown what may be referred to as a "zero position" in which all reflecting surfaces are parellel and both virtual images are superimposed, such that a single black image 26' of curve 26 is seen on a virtual image plane 24', a black image 28' of curve 28 likewise is formed on image plane 24', and images 26' and 28' bear the same reliable disposition as curves 26 and 28.

In actuality, since the optical paths are not precisely equal, by reasons of a displacement in the position of mirror 58 discussed hereinafter, the virtual images formed along the two optical paths are not precisely coplanar in the zero position, although they may be considered as such for the purposes of this discussion as they are so closely spaced that the images appear to superimpose. Thus in a typical instrument having a 20 inch optical path the planes of the virtual images formed along the two paths would be parallel and spaced about 0.1 inch apart in the zero position.

In utilizing the comparator of this invention referring to FIGURE 6 mirror 58 is then rotated by manipulating knob 104 to adjust the position of eccentric 96 which, as noted referring to FIGURE 4, exerts a camming action on arm 94 which controls the angular disposition of mirror 58. As knob 104 is turned the images 26' and 28' divide vertically such that line 28', for example, will become a pair of parallel vertically spaced lines, one having a red appearance reflecting the lack of reflectance of light from curve 28 along the first optical path and the other having a green appearance representing the lack of reflectance of light from curve 28 along the second optical path. In adjusting knob 104 the red image of one curve, for example, curve 26, is made to line up with the green image of the other curve, i.e. curve 28, such that the combined curve has common base line having a generally black appearance caused by superimposition of the red image 26' and the green image 28' along the first and second light paths. Since the images are not superimposed longitudinally, anomalies in curve 26 will be represented by red departures of the black base line and anomalies appearing in cure 28 will be represented by green departures from the black base line. Thus in the illustrated case red portions of image 26' and green portions of image 28' bear the same longitudinal relationship of each other as the anomalies on original curves 26 and 28 bear to each other.

As indicated above there is an adjustment in the displacement of mirror 58. Thus in the zero position the planes of the reflecting surfaces of mirrors 54, 58, 62 and 66 are set at a 45° angle with respect to the plane of log 24 and positioned such that the line of sight along the two optical paths is perpendicular to the plane of log 24. Also in the zero position the reflecting surfaces of mirrors 54 and 66 are coplanar, while the reflecting surfaces of mirrors 58 and 62 confronting opposite sides of mirrors 54 and 66 are positioned parallel to each other and to the planes of the reflecting surfaces of mirrors 54 and 66.

If the reflecting surfaces of mirrors 58 and 62 were equally spaced from the last noted plane, the virtual images in the zero position along the two optical paths would be coplanar. Referring to FIGURE 6, as adjustment is made to align the images of a pair of curves, such as curves 26 and 28, for example by rotating mirror 58 counterclockwise, as suggested in FIGURE 6, to bring the red line image of line 26 apparently downward to coincide with the green line image of line 28, it will be apparent that the first optical path (that reflected by mirror 58) is made slightly longer than the second optical path (that reflected off mirror 62). In order to compensate for this disparity of optical path length when line images are superimposed, the above noted adjustment in the positioning of mirror 58 is made; that is, mirror 58 is spaced approximately 0.1 inch closer to the plane of the reflecting surfaces of mirrors 54 and 66 than is the reflecting surface of mirror 62, such that, as noted above with reference to FIGURE 5, in the zero position the virtual images are not precisely coplanar. When adjustment for lateral displacement has been made to align the two curves as illustrated in FIGURE 6 although the virtual images will still not be coplanar, the base lines of curves 26' and 28' will be coincident.

It will be noted that in constructing a comparator in accordance with this invention for reading a well-log where three curves are involved, the line of sight along the second optical path (that reflected by mirror 62) will normally be arranged perpendicular to the middle of three curves of interest on the well-log, and the adjustment of knob 104 to remove lateral displacement of curve images will be made to bring the top curve downward into registry with the middle one or to bring the bottom curve upward into registry with the middle curve in order to achieve maximum accuracy.

Referring to FIGURE 7, when the red line image 26' and the green line image 28' have been laterally brought together, green line image 30' is then moved longitudinally to bring a pair of corresponding anomalies in the two curves into coincidence by rotating knob 120. The rotation of knob 120 rotates frame 64, and mirror 62 and dichroic beam splitter 66 are thereby also rotated. The first optical path and therefore the red line image 26' are uneffected by such movement, but the second optical path, however, is twisted and the green line image 28' moves in a longitudinal direction. In FIGURE 7 green line image 28' is shown moved to the right until it coincides with red line image 26' at the location of the pair of corresponding anomalies whose longitudinal displacement is to be measured. In this position, the viewer sees a single black line image 29'. In order to accomplish this superposition of images 26' and 28', mirror 62 and dichroic beam splitter 66 were rotated through angle $b$, the size of which is a measure of the longitudinal displacement of curve 30 from curve 28.

Prior to operation of comparator 12, the instrument is aligned and calibrated. Mirror 62 and dichroic beam splitter 66 are rotated slightly so that the two images of the reference lines 36 are close to each other. If upon rotating mirror 58 these images do not remain parallel, journal 76 is adjusted in or out until the images remain parallel in any position of mirror 58. Mirror 62 and dichroic beam splitter 66 are then rotated until the images of the reference line are superimposed and a single black line image is seen. If upon rotating mirror 58, the black line splits into two colored images, journal 76 is moved up or down until superposition is maintained at any angle of mirror 58. With mirror 62 and dichroic beam splitter 66 at this position, pointer 50 is set to zero shift on index scale 52 and a set screw 51 which holds the pointer on shaft 68 is tightened.

Index scale 52 is calibrated empirically by setting the shift of the images using a series of known values and marking the position of the pointer on the scale. Values on the scale are labeled according to the scale of the log to be used and conversion from one scale to another may be easily accomplished by simply changing index scale 52.

After calibration and alignment are completed dip meter log 24 is placed on log winding table 16 and unrolled until a characteristic anomaly appears on all three curves, the anomaly on curve 28 being brought to the reference line 36. Curve 26 is then superimposed on curve 28 as described above with reference to FIGURES 5, 6 and 7, and the reading of pointer 50 on index scale 52 recorded. Next curve 30 in like manner is superimposed on curve 28 and the reading of the pointer again recorded. The values of the auxiliary curves 32 at reference line 36 are likewise recorded. One benefit of the arrangement of the present invention is that the auxiliary curves 32 can be read while the dip meter log is on the log winding table.

In the apparatus explained above with reference to the drawings a dichroic beam splitter 66 was used. This can be replaced by an ordinary beam splitter; however, in that case it is more difficult for the viewer to select the proper images for comparison since all line images will appear black. Other than this increased burden on the viewer, this substitution has no effect on the accuracy of the instrument.

Although in the above described apparatus only longitudinal displacement was measured, it is within the scope of the present invention likewise to measure the transverse displacement between points on a common plane by simply extending stub shaft 72 through wall 118 and mounting a pointer and index scale similar to the arrangement presently used for measuring longitudinal displacement.

As shown in FIGURE 1, the preferred embodiment of the present invention is well suited to use for extended periods. The comparator 12 can be placed on a desk while the viewer is seated comfortably in front of it. Eye piece 48 is sufficiently large to provide an ease of viewing without focusing at a specific point.

Comparators built according to this invention can be expected to function with an accuracy of .05 inch at displacement up to 3 inches in any direction.

What is claimed is:

1. Apparatus for superimposing virtual images of objects displaced in a common plane comprising:
    an enclosed housing having a viewing aperture in a first plane and a sighting aperture in a second plane;
    a frame mounted within said housing and rotatable about a first axis substantially perpendicular to said second plane;
    a first dichroic mirror mounted in said frame in a third plane substantially perpendicular to said second plane and rotatable with said frame;
    a second mirror having a reflective surface and mounted in said frame in a fourth plane and rotatable with said frame, said fourth plane substantially parallel to and displaced from said third plane, said second mirror reflective surface facing said dichroic mirror;
    a third semi-transparent mirror having a reflective surface and a non-reflectve surface and fixedly mounted within said housing in a fifth plane substantially perpendicular to said second plane and in the line of sight from said second mirror to said viewing aperture with said non-reflective surface facing and displaced from said second mirror reflective surface;
    a fourth mirror having a reflective surface facing said dichroic mirror and said third miror reflective surface and rotatably mounted within said housing for rotation about a second axis substantially parallel to and displaced from said second plane and substantially parallel to and displaced from said fifth plane, with said dichroic mirror mounted in the line of sight from said sighting aperture to said fourth mirror;
    means for rotating said fourth mirror; and
    means for rotating said frame.

2. Apparatus as claimed in claim 1 in which said fifth plane intersects said common plane at an angle of 45°.

3. Apparatus as claimed in claim 1 and which further comprises a planar objective surface external of said housing for supporting objects for superposition, and supporting means attached to the outside of said housing for maintaining said housing in a first angular relationshilp with respect to said planar objective surface, and in what an extension of the line of sight from said fourth mirror to said sighting aperture intersects said planar objective surface.

4. Apparatus as claimed in claim 3 in which said angular relationship is such that said fifth plane and the plane of said objective surface intersects at a 45° angle.

References Cited

UNITED STATES PATENTS

| | | |
|---|---|---|
| 2,747,284 | 5/1956 | Christoph. |
| 2,786,385 | 3/1957 | Satre et al. |
| 2,922,333 | 1/1960 | Subach. |
| 3,055,261 | 9/1962 | Braun et al. |

OTHER REFERENCES

Ferre et al.: Dipmeter Curve Comparator, an Optical Aid to the Interpretation of Dipmeter Data, The Review of Sci. Inst., vol. 28, No. 9, September 1957, pp. 690–693.

RONALD L. WIBERT, Primary Examiner

ORVILLE B. CHEW II, Assistant Examiner

U.S. Cl. X.R.

350—301